(12) United States Patent
Beckmann

(10) Patent No.: US 11,268,590 B2
(45) Date of Patent: Mar. 8, 2022

(54) SEPARATION DEVICE FOR SEPARATING A WORKING CHAMBER AND A COMPENSATION CHAMBER OF A HYDRAULICALLY DAMPING MOUNT, AND A HYDRAULICALLY DAMPING MOUNT

(71) Applicant: VIBRACOUSTIC GMBH, Darmstadt (DE)

(72) Inventor: Wolfgang Beckmann, Darmstadt (DE)

(73) Assignee: Vibracoustic SE, Darmstadt (DE)

( * ) Notice: Subject to any disclaimer, the term of this patent is extended or adjusted under 35 U.S.C. 154(b) by 217 days.

(21) Appl. No.: 16/618,000

(22) PCT Filed: Apr. 30, 2018

(86) PCT No.: PCT/EP2018/061047
§ 371 (c)(1),
(2) Date: Nov. 27, 2019

(87) PCT Pub. No.: WO2018/219568
PCT Pub. Date: Dec. 6, 2018

(65) Prior Publication Data
US 2020/0109759 A1    Apr. 9, 2020

(30) Foreign Application Priority Data

Jun. 1, 2017 (DE) .................... 10 2017 112 168.4

(51) Int. Cl.
*F16F 13/10* (2006.01)
*B60K 5/12* (2006.01)
*F16F 13/18* (2006.01)

(52) U.S. Cl.
CPC .......... *F16F 13/105* (2013.01); *B60K 5/1208* (2013.01); *F16F 13/18* (2013.01);
(Continued)

(58) Field of Classification Search
CPC .. F16D 13/105; F16D 13/18; F16D 2224/025; F16D 2226/045; F16D 2230/30; B60K 5/1208
See application file for complete search history.

(56) References Cited

U.S. PATENT DOCUMENTS 4,651,980 A * 3/1987 Morita ................ F16F 13/106
  267/140.13
4,657,232 A * 4/1987 West ...................... F16F 13/26
  267/140.13
(Continued)

FOREIGN PATENT DOCUMENTS

DE   196 20 971 A1   11/1997
DE   29724394 U1     12/2000
(Continued)

OTHER PUBLICATIONS

International Search Report dated Jul. 25, 2018 for PCT/EP2018/061047.

*Primary Examiner* — Robert A. Siconolfi
*Assistant Examiner* — James K Hsiao
(74) *Attorney, Agent, or Firm* — Fishman Stewart PLLC

(57) ABSTRACT

A separation device for separating a working chamber and a compensation chamber of a hydraulically damping mount includes a first nozzle disc and a second nozzle disc made of a first material and forming a damping channel interconnecting the working chamber and the compensation chamber. The first nozzle disc may include a sealing member made of a second material and abut the second nozzle disc to seal the damping channel. A hydraulically damping mount for mounting a motor vehicle unit may having a separating device.

9 Claims, 2 Drawing Sheets

(52) U.S. Cl.
CPC ... *F16F 2224/025* (2013.01); *F16F 2226/045* (2013.01); *F16F 2230/30* (2013.01)

(56) References Cited

U.S. PATENT DOCUMENTS

| | | | | |
|---|---|---|---|---|
| 4,671,227 | A | * | 6/1987 | Hollerweger ........... F16F 13/22 |
| | | | | 267/140.13 |
| 4,708,329 | A | * | 11/1987 | Tabata .................... F16F 13/10 |
| | | | | 267/140.13 |
| 4,709,907 | A | * | 12/1987 | Thorn ................... F16F 13/106 |
| | | | | 267/140.13 |
| 4,726,573 | A | * | 2/1988 | Hamaekers ........... F16F 13/106 |
| | | | | 137/512.15 |
| 4,925,162 | A | * | 5/1990 | Kojima ................. F16F 13/106 |
| | | | | 267/122 |
| 4,938,463 | A | * | 7/1990 | Miyamoto ............ F16F 13/106 |
| | | | | 267/140.13 |
| 5,104,100 | A | * | 4/1992 | Simuttis ................ F16F 13/106 |
| | | | | 267/140.13 |
| 5,240,233 | A | * | 8/1993 | Kato ....................... F16F 13/10 |
| | | | | 267/140.13 |
| 5,386,973 | A | * | 2/1995 | Brenner ................ F16F 13/108 |
| | | | | 267/140.13 |
| 5,571,263 | A | | 11/1996 | Koester et al. |
| 5,876,022 | A | * | 3/1999 | Simuttis ................ F16F 13/107 |
| | | | | 267/140.13 |
| 6,612,554 | B1 | * | 9/2003 | Linn ..................... F16F 13/105 |
| | | | | 267/140.13 |
| 7,494,115 | B2 | * | 2/2009 | Maeno .................. F16F 13/105 |
| | | | | 267/140.13 |
| 9,163,695 | B2 | * | 10/2015 | Saito ................... F16F 13/1463 |
| 9,878,604 | B2 | * | 1/2018 | Furusawa ............. F16F 13/105 |
| 10,316,927 | B2 | * | 6/2019 | Schemer ............... F16F 13/105 |
| 2005/0206056 | A1 | * | 9/2005 | Maeno .................. F16F 13/106 |
| | | | | 267/140.13 |
| 2009/0140477 | A1 | * | 6/2009 | Michiyama ........... F16F 13/106 |
| | | | | 267/121 |
| 2013/0038006 | A1 | * | 2/2013 | Saito ..................... F16F 13/107 |
| | | | | 267/140.13 |
| 2013/0069289 | A1 | * | 3/2013 | Ishikawa ............... F16F 13/106 |
| | | | | 267/140.13 |
| 2013/0153741 | A1 | * | 6/2013 | Pichel ................... F16F 1/3849 |
| | | | | 248/634 |
| 2013/0154171 | A1 | * | 6/2013 | Nishi ...................... F16F 13/08 |
| | | | | 267/140.13 |
| 2015/0330476 | A1 | * | 11/2015 | Satori ..................... F16F 13/10 |
| | | | | 267/140.13 |
| 2015/0337919 | A1 | * | 11/2015 | Kojima ................... F16F 13/08 |
| | | | | 267/140.13 |
| 2015/0367698 | A1 | * | 12/2015 | Stautner .................. F16C 17/04 |
| | | | | 384/144 |
| 2016/0053844 | A1 | * | 2/2016 | Nagasawa ............. F16F 13/106 |
| | | | | 267/140.13 |
| 2017/0089420 | A1 | * | 3/2017 | Kadowaki ............. B60K 5/1208 |
| 2018/0051769 | A1 | * | 2/2018 | Kim ...................... F16F 13/106 |
| 2018/0291978 | A1 | | 10/2018 | Vollmann et al. |
| 2018/0320753 | A1 | | 11/2018 | Beckmann et al. |

FOREIGN PATENT DOCUMENTS

| | | |
|---|---|---|
| DE | 39614908 T2 | 1/2002 |
| DE | 10 2012 217427 A1 | 5/2014 |
| DE | 10 2015 015487 A1 | 4/2017 |
| DE | 10 2015 118931 A1 | 5/2017 |
| EP | 1574743 A1 | 9/2005 |
| JP | S61 144443 A | 7/1986 |

* cited by examiner

SEPARATION DEVICE FOR SEPARATING A WORKING CHAMBER AND A COMPENSATION CHAMBER OF A HYDRAULICALLY DAMPING MOUNT, AND A HYDRAULICALLY DAMPING MOUNT

CROSS-REFERENCE TO RELATED APPLICATIONS

This application is a National Stage Patent Application of International Patent Application PCT/EP2018/061047, filed Apr. 30, 2018, which claims the benefit of German Application Serial No. 10 2017 112 168.4, filed Jun. 1, 2017, the contents of each are incorporated by reference in their entireties.

TECHNICAL FIELD

The present invention relates to a separation device for separating a working chamber and a compensation chamber of a hydraulically damping mount, comprising a first nozzle disc and a second nozzle disc made of a first material and forming a damping channel connecting the working chamber and the compensation chamber. Furthermore, the invention relates to a hydraulically damping mount for supporting a motor vehicle unit having such a separation device.

BACKGROUND

A hydraulically damping mount of the type mentioned above is used to support a motor vehicle unit, such as a motor vehicle engine or a transmission, on a motor vehicle body in order to damp the vibrations generated by the motor vehicle unit. A hydraulically damping mount has a support mount for attaching the motor vehicle unit to the mount and a support, which are interconnected by an elastomeric supporting spring. Together with the support, the supporting spring limits a working chamber which is separated from a compensation chamber by a separating device. The compensation chamber is limited by a compensating diaphragm. The working chamber and the compensation chamber are filled with a fluid and connected to each other via a damping channel inserted in the separating device.

The damping of the vibrations introduced by the motor vehicle unit is performed by the hydraulic system consisting of the working chamber, the compensation chamber and the damping channel. The vibrations introduced cause the supporting spring to move, thereby creating hydraulic pressure inside the working chamber. As a result of the pressure, the fluid flows from the working chamber via the damping channel into the compensation chamber. Due to the small diameter of the damping channel and the resulting high mechanical transmission, which results from the equivalent, displaced cross-section of the supporting spring in relation to the cross-section of the damping channel, the vibrations introduced are damped or absorbed.

SUMMARY

The present invention is based on the task of creating a separation device and a hydraulically damping mount with improved damping.

To solve the problem, a separation device and a hydraulically damping mount are proposed.

Advantageous embodiments of the separation device are the subject matter of the dependent claims.

According to an aspect, a separation device for separating a working chamber and a compensation chamber of a hydraulically damping mount is proposed, comprising a first nozzle disc and a second nozzle disc made of a first material and forming a damping channel interconnecting the working chamber and the compensation chamber, the first nozzle disc comprising a sealing member made of a second material and abutting the second nozzle disc to seal the damping channel.

The sealing member seals the damping channel reliably and with a high process stability and thus prevents fluid from escaping from the damping channel while it flows from the working chamber into the compensation chamber to damp the vibrations introduced. This prevents frequency shifting and increased tolerances so that a hydraulically damping mount fitted with the separation device provides improved damping and thus better performance. In order to allow a back and forth flow between the two chambers, both nozzle discs are provided with one opening each through which fluid can flow into the damping channel and/or out of the damping channel.

In an advantageous embodiment, the first nozzle disc and the sealing member are manufactured using a two-component injection moulding process. This means that the sealing member can be manufactured in a simple, reliable and cost-effective manner and connected to the first nozzle disc. First, the first material can be injected into a cavity of an injection mould, and then the second material is injected into the cavity. Furthermore, the first material and the second material can be injected simultaneously into a cavity of an injection mould.

In an advantageous embodiment, the first material is a fibre-reinforced plastic, and the second material is a thermoplastic elastomer. A separation device made of fibre-reinforced plastic has a low weight and at the same time a high strength against the hydraulic pressure occurring in the working chamber. A sealing member made of thermoplastic elastomer has sufficient sealing properties to seal the damping channel.

In an advantageous embodiment, the sealing member surrounds the first nozzle disc on the outer circumferential side. The sealing member may be designed as a sealing edge that surrounds the first nozzle disc on the outer circumferential side. Furthermore, the sealing member may be designed as a sealing lip projecting, in particular projecting vertically, from the first nozzle disc which surrounds the outer circumferential side of the first nozzle disc.

In an advantageous embodiment, the second nozzle disc has a receiving opening into which the first nozzle disc is inserted. Advantageously, the first nozzle disc inserted into the receiving opening of the second nozzle disc and the second nozzle disc together form the damping channel. For this purpose, the second nozzle disc may have a channel-shaped recess which is covered by the first nozzle disc, in particular a section of the first nozzle disc. The sealing member is preferably positioned in a sealing manner against an inner circumferential wall of the receiving opening in order to reliably seal the damping channel. Advantageously, the first nozzle disc is inserted into the receiving opening by means of a press fit in order to ensure sufficient sealing of the damping channel.

There may be an interference fit between the sealing member and an inner circumferential wall of the receiving opening. The interference fit ensures sufficient sealing of the damping channel.

In an advantageous embodiment, the receiving opening has a circumferential shoulder against which the sealing member abuts. The first nozzle disc is inserted, in particular pressed, into the receiving opening until the sealing member abuts against the shoulder. The combination of the interference fit between the inner circumferential wall and the sealing member and the contact of the sealing member with a shoulder ensures a reliable sealing of the damping channel.

In an advantageous embodiment, the channel is formed from a first channel section and a second channel section, which are separated from one another by the first nozzle disc and sealed from one another by means of the sealing member. This creates a double-deck channel. A double-deck channel enables a damping shift towards low frequencies and has an optimised decoupling with a maximum possible open area. Advantageously, the first nozzle disc has the first channel section, and the second nozzle disc has the second channel section. In an advantageous embodiment, the first channel section and the second channel section are arranged one above the other. Furthermore, the two channel sections may be arranged next to each other.

In an advantageous configuration, the first nozzle disc has a channel on the outer circumferential side which abuts against the inner circumferential wall of the receiving opening in order to form the first channel section, the channel having a first leg, a second leg and a base interconnecting the two legs, the sealing member being arranged at a free end of the first leg. Preferably, the channel is C-shaped in cross-section. Further advantageously, the first leg separates the two channel sections from one another, wherein the sealing member arranged at, in particular moulded onto, the free end of the first leg seals the two channel sections from one another.

In an advantageous embodiment, a diaphragm is received between the nozzle discs. The diaphragm is made of an elastic, in particular elastomeric, material and serves to decouple high-frequency, small amplitude vibrations. For this purpose, the diaphragm oscillates at high-frequency, small amplitude oscillations, so that damping is decoupled via the damping channel. The diaphragm can be arranged with a clearance between the two nozzle discs or clamped in sections.

According to a further aspect, a hydraulically damping mount for mounting a motor vehicle unit is proposed, comprising a support and a supporting mount which are connected to one another by a supporting spring made of an elastomeric material, the supporting spring delimiting a working chamber which is separated from a compensation chamber by a separating device, the working chamber and the compensation chamber being filled with a fluid and being connected to one another via a damping channel introduced into the separating device.

In the following, a separating device, a hydraulically damping mount and other features and advantages are explained in more detail using an exemplary embodiment, which is schematically illustrated in the figures. Shown are:

DETAILED DESCRIPTION

Figure 1:
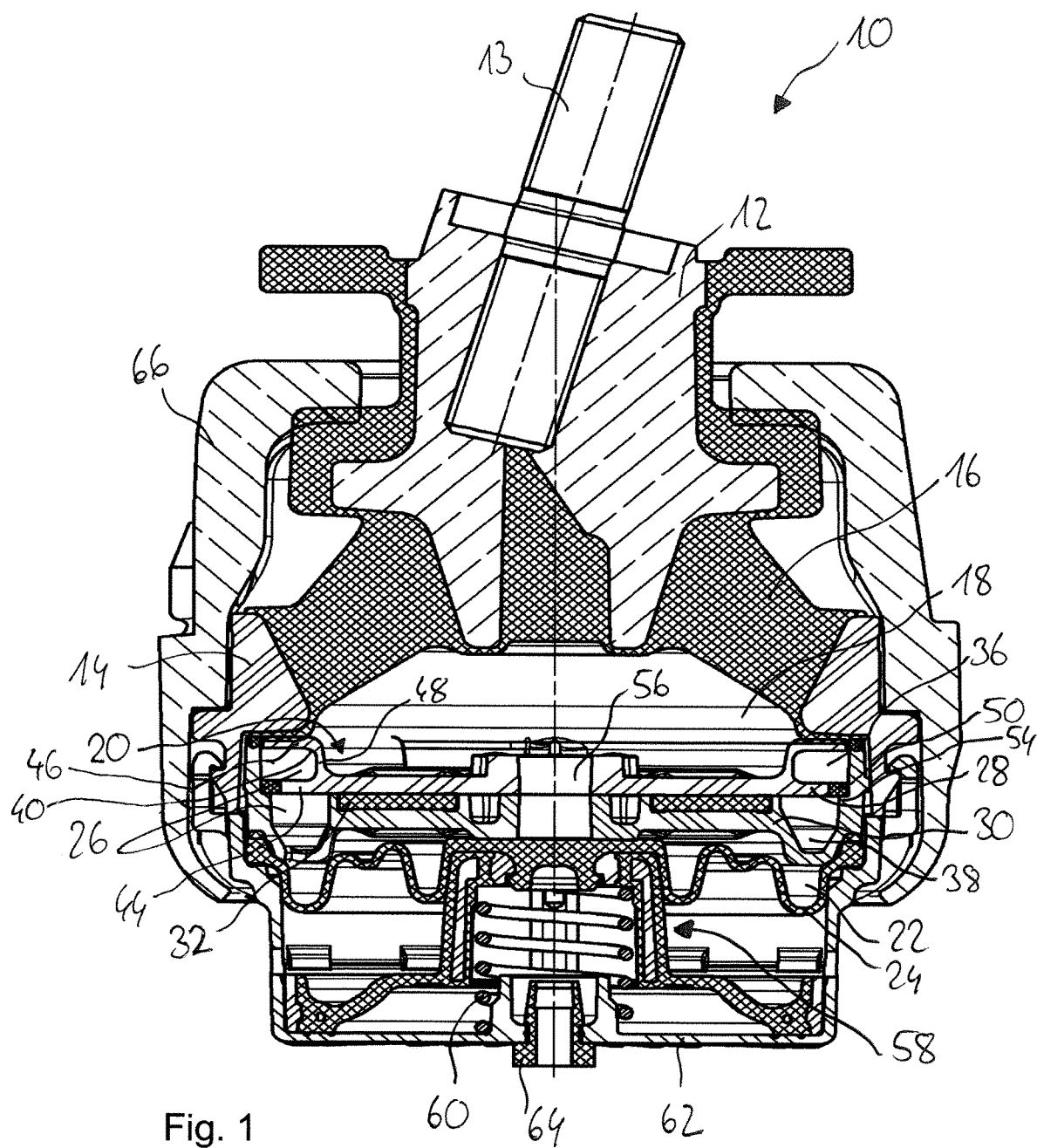
FIG. 1 a vertical section through a hydraulically damped mount having a separating device.

FIG. 1 shows a hydraulically damping mount 10 which is used to mount a motor vehicle unit, which is not shown, such as a motor vehicle engine or transmission, on a motor vehicle body, which is not shown.

The hydraulically damping mount 10 has a supporting mount 12 and a support 14, which are connected to each other by a supporting spring 16 made of an elastomeric material. A bolt 13 is inserted in the supporting mount 12 to fasten a motor vehicle unit that is not shown. The supporting spring 16 absorbs the static loads and provides acoustic insulation.

The supporting mount 12, the support 14 and the supporting spring 16 delimit a working chamber 18, which is separated from a compensation chamber 22 by a separating device 20. The compensation chamber 22 is delimited by a compensating diaphragm 24. The working chamber 18 and the compensation chamber 22 are filled with a fluid. The separating device 20 has a damping channel 26, which connects the working chamber 18 and the compensating chamber 22 in a liquid-conducting manner.

Via the damping channel 26, low-frequency, large-amplitude vibrations introduced by the motor vehicle unit are damped or absorbed. The vibrations introduced lead to a movement of the supporting spring 16, whereby a hydraulic pressure is built up within the working chamber 18. As a result of the pressure, the fluid flows from the working chamber 18 via the damping channel 26 into the compensation chamber 22. Due to the small diameter of the damping channel 26 and the resulting high mechanical transmission, which results from the equivalent displaced cross-section of the supporting spring 16 in relation to the cross-section of the damping channel, the vibrations introduced are damped or absorbed.

Figure 2:
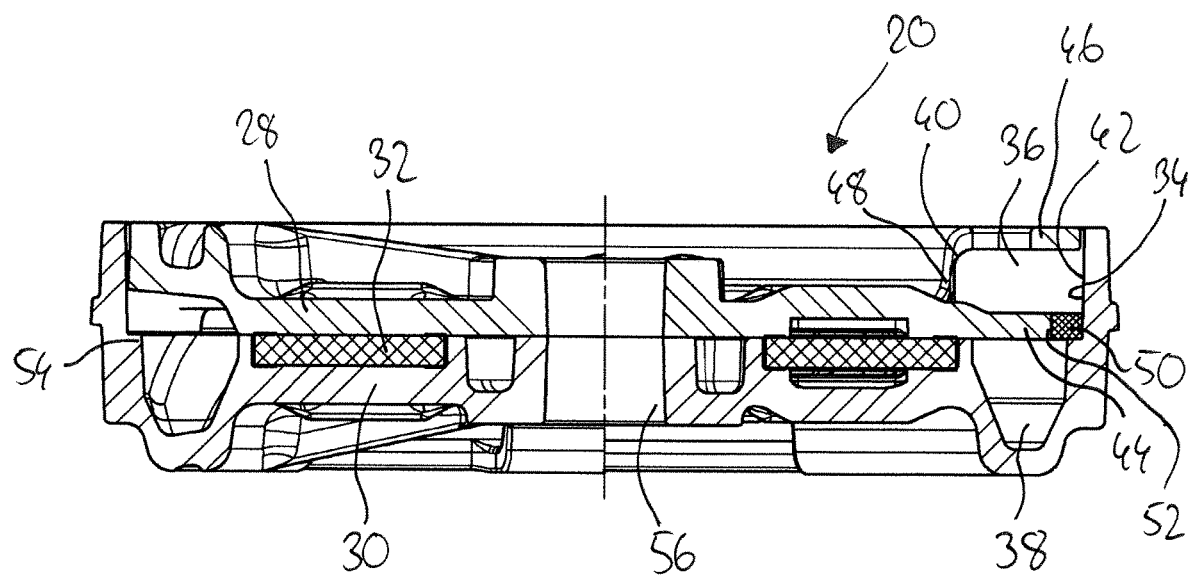
FIG. 2 an enlarged view of the separating device shown in FIG. 1.

As can be seen in FIG. 2, the separating device 20 has a first nozzle disc 28 and a second nozzle disc 30 made of a first material. The first material may be a plastic, especially a fibre-reinforced plastic. Between the nozzle discs 28, 30 there is a diaphragm 32 made of an elastomeric material which is clamped between the nozzle discs 28, 30 at the edges.

The diaphragm 32 serves to decouple high-frequency, low-amplitude vibrations, i.e. in the acoustically relevant range, by vibrating at high-frequency, low-amplitude vibrations, whereby damping is decoupled via the damping channel 26.

In order to allow a back and forth flow between the two chambers, both nozzle discs 28, 30 are provided with an opening each (not shown), through which the fluid can flow into the damping channel 26 and/or out of the damping channel 26.

The second nozzle disc 30 has a receiving opening 34 into which the first nozzle disc 28 is inserted. The first nozzle disc 28 is inserted into the receiving opening 34 by means of an interference fit.

As can be seen in FIG. 2, the first nozzle disc 28 divides the damping channel 26 into a first channel section 36 and a second channel section 38. The two channel sections 36, 38 are arranged one above the other.

The first nozzle disc 28 has a circumferential channel 40 on the outer circumferential side which abuts against an inner circumferential wall 42 of the receiving opening 34 and forms the first channel section 36. The channel 40 is approximately C-shaped and has a first leg 44, a second leg 46 and a base 48 connecting the two legs 44, 46 to each other, the first leg 44 separating the two channel sections 36, 38 from each other.

In order to seal the two channel sections 36, 38 from one another, the first nozzle disc 28 has a sealing member 50 made of a second material, which rests against the inner circumferential wall 42 of the receiving opening 34 in a sealing manner. The sealing member 50 is arranged at a free end 52 of the first leg 44 and, in the present case, is designed as a sealing edge surrounding the first nozzle disc 28, in particular the first leg 44. Alternatively, the sealing member 50 may be designed as a sealing lip. There is an interference fit between the inner circumferential wall 42 and the sealing member 50.

In order to achieve improved sealing of the two channel sections 36, 38, the receiving opening 34 has a circumferential shoulder 54 against which the sealing member 50 rests.

The sealing member 50 is made of a thermoplastic elastomer. This allows the first nozzle disc 28 and the sealing member 50 to be manufactured using the two-component injection moulding process. The sealing member 50 injection-moulded onto the first nozzle disc 28 using the two-component injection moulding process can thus be manufactured cost-effectively and reliably seals the two channel sections 36 and 38 from one another. This prevents internal leakage, so that the hydraulically damping mount 10 has improved damping and thus better performance.

As can also be seen in FIG. 1, an idling channel 56, which can also be referred to as an absorber channel and which can be opened or closed by means of a switching device 58, is introduced into the separating device 20.

In the open position, the idling channel 56 reduces the dynamic rigidity of the mount when the engine is idling. In the open position, a liquid column can oscillate within the idling channel 56, so that the high-frequency engine vibrations occurring during engine idling are transmitted in a significantly mitigated form to a motor vehicle body (not shown) due to the small effective spring rate.

When the absorber channel 56 is closed, the hydraulic damping mount 10 operates like a conventional mount by damping low-frequency, large-amplitude vibrations by a fluid displacement within the damping channel 26 and by isolating or decoupling high-frequency, small-amplitude vibrations by means of the diaphragm 32.

The switching device 58 has a spring element 60 connected to the compensating diaphragm 24 and supported by a mount cover 62. The spring element 60 presses the compensating diaphragm 24 against the separation device 20 to close the idling channel 56. In order to open the idle channel 56, the switching device 58 is connected to a vacuum source (not shown) via a port 64, wherein by applying a vacuum, the compensating diaphragm 24 is moved away from the separating device 20 against the force of the spring element 60 in order to open the idling channel 56.

The mount cover 62 is attached to the support 14 by means of a clip connection. The mount cover 62 supports the hydraulically damping mount 10 on a vehicle body (not shown). Furthermore, the hydraulically damping mount 10 is enclosed by a housing 66, which protects the mount 10 from thermal impacts.

The invention claimed is:

1. A separation device for separating a working chamber and a compensation chamber of a hydraulically damping mount, the separation device comprising:
   a first nozzle disc; and
   a second nozzle disc;
   wherein the first nozzle disc and the second nozzle disc are made of a first material and form a damping channel that interconnects the working chamber and the compensation chamber,
   wherein the first nozzle disc comprises a sealing member made of a second material and abuts the second nozzle disc to seal the damping channel,
   wherein the second nozzle disc has a receiving opening into which the first nozzle disc is inserted; and
   wherein the receiving opening has a circumferential shoulder against which the sealing member abuts.

2. The separation device according to claim 1, wherein the first nozzle disc and the sealing member are manufactured using a two-component injection moulding process.

3. The separation device according to claim 1, wherein the first material is a fibre-reinforced plastic; and the second material is a thermoplastic elastomer.

4. The separation device according to claim 1, wherein the sealing member surrounds the first nozzle disc on an outer circumferential side.

5. The separation device according to claim 1, wherein the receiving opening has a circumferential shoulder against which the sealing member abuts.

6. The separation device according to claim 5, including a channel formed by a first channel section and a second channel section which are separated from one another by the first nozzle disc and sealed from one another by means of the sealing member.

7. The separation device according to claim 6, wherein the first nozzle disc has the channel on an outer circumferential side which abuts against the inner circumferential wall of the receiving opening in order to form the first channel section; the channel has a first leg, a second leg, and a base interconnecting the two legs; and the sealing member is arranged at a free end of the first leg.

8. The separation device according to claim 1, wherein a diaphragm is received between the nozzle discs.

9. A hydraulically damping mount for mounting a motor vehicle unit, the hydraulically damping mount comprising:
   a support, and
   a supporting mount connected to the support by a supporting spring made of an elastomeric material,
   wherein the supporting spring delimits the working chamber which is separated from the compensation chamber by the separation device according to claim 1, and
   the working chamber and the compensation chamber are filled with a fluid and are connected to one another via the damping channel.

* * * * *